United States Patent
Mills

(10) Patent No.: US 9,368,039 B2
(45) Date of Patent: Jun. 14, 2016

(54) EMBEDDED LEARNING TOOL

(76) Inventor: Sharon M. Mills, Tallahassee, FL (US)

(*) Notice: Subject to any disclaimer, the term of this patent is extended or adjusted under 35 U.S.C. 154(b) by 2257 days.

(21) Appl. No.: 12/217,583

(22) Filed: Aug. 25, 2008

(65) Prior Publication Data

US 2010/0047755 A1 Feb. 25, 2010

(51) Int. Cl.
*G09B 7/00* (2006.01)

(52) U.S. Cl.
CPC .......................... *G09B 7/00* (2013.01)

(58) Field of Classification Search
CPC .......................................... G09B 7/00
USPC ........................ 434/322, 323, 350, 351, 365
See application file for complete search history.

(56) References Cited

U.S. PATENT DOCUMENTS

| | | | |
|---|---|---|---|
| 2002/0059377 A1* | 5/2002 | Bandhole et al. | 709/204 |
| 2002/0178058 A1* | 11/2002 | Ritchie et al. | 705/14 |
| 2003/0014400 A1* | 1/2003 | Siegel | 707/3 |
| 2003/0074320 A1* | 4/2003 | Riggs | 705/51 |
| 2006/0293048 A1* | 12/2006 | Swanson et al. | 455/426.1 |
| 2008/0108037 A1* | 5/2008 | Beamish | 434/350 |
| 2008/0318200 A1* | 12/2008 | Hau et al. | 434/362 |
| 2009/0047928 A1* | 2/2009 | Utsch et al. | 455/410 |
| 2009/0181356 A1* | 7/2009 | Dasgupta | 434/362 |
| 2010/0257268 A1* | 10/2010 | Landry et al. | 709/225 |

* cited by examiner

*Primary Examiner* — Bruk Gebremichael
(74) *Attorney, Agent, or Firm* — J. Wiley Horton

(57) ABSTRACT

An educational tool which is embedded within the functions of common computing devices. In the preferred embodiment, the educational tool is used as a "gateway" to a selected function or functions in a primary computing device, such as a cell phone. An educational question is presented to the user of the primary computing device. The educational question must be correctly answered before use of the selected function is allowed. The user's performance is preferably transmitted to a control computing device which can be used to monitor the user's performance.

15 Claims, 11 Drawing Sheets

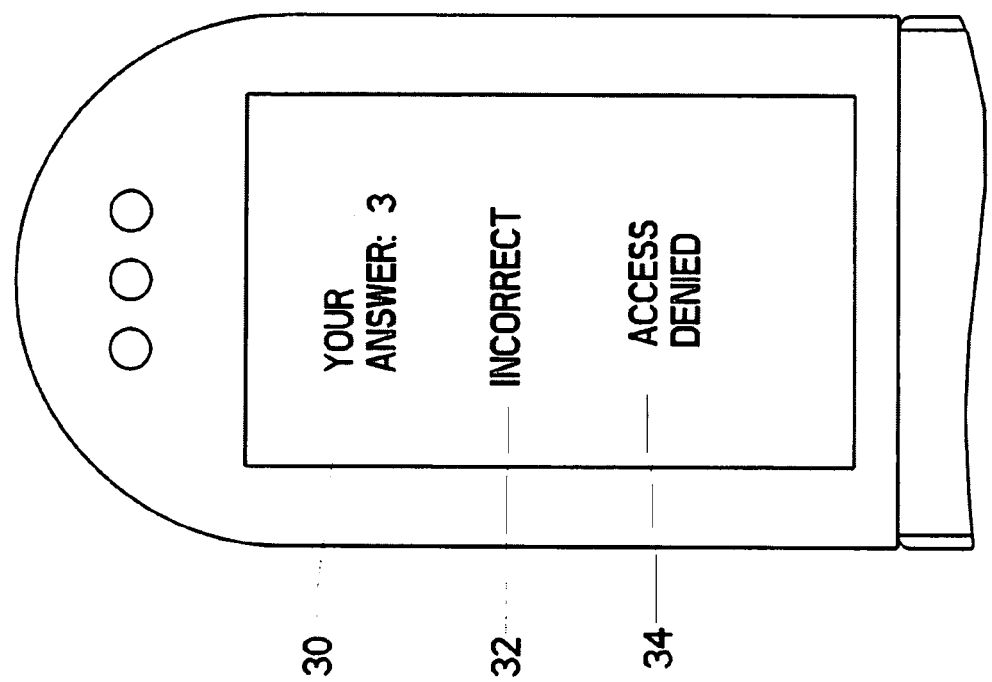

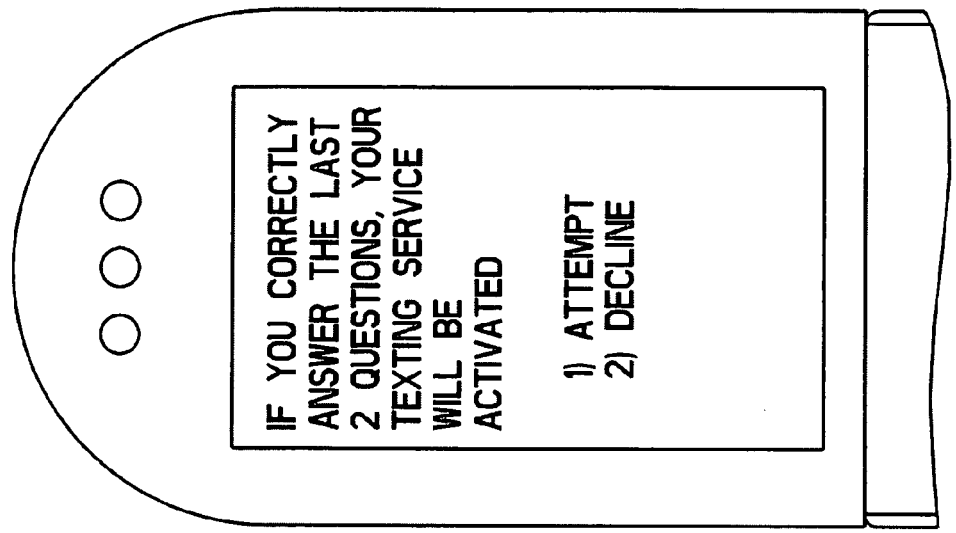
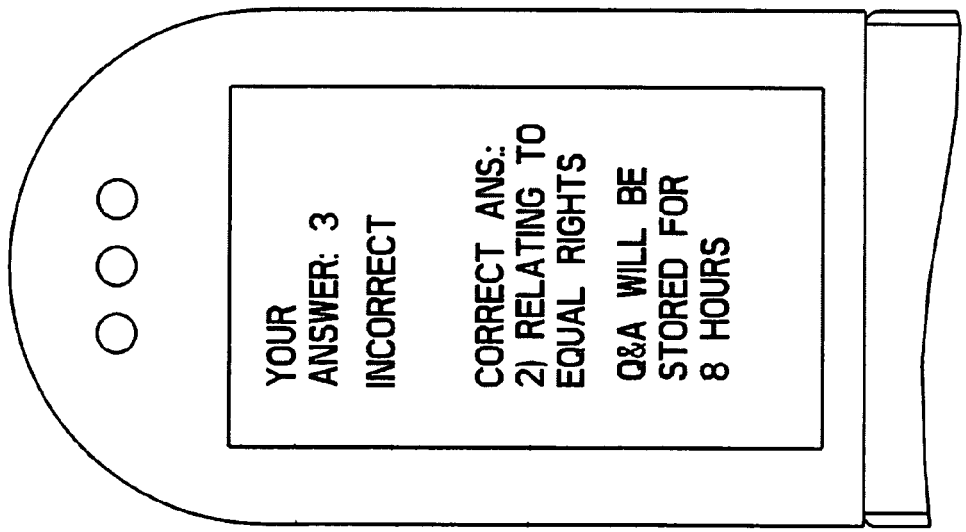

RESULTS BY DATE

| DATE | SCORE | QUERY |
|---|---|---|
| AUGUST 4 | 3/3 | ▼ |
| AUGUST 5 | 2/4 | ▼ |
| AUGUST 6 | 1/2 | ▼ |
| AUGUST 7 | 1/2 | ▼ |
| AUGUST 8 | 6/9 | ▼ |
| AUGUST 9 | 8/11 | ▼ |
| AUGUST 10 | 1/2 | ▼ |

FIG. 12

RESULTS BY SUBJECT

| LAST 30 DAYS ▼ | |
|---|---|
| VOCABULARY | 54/81 |
| GEOMETRY | 6/28 |
| HISTORY | 26/32 |
| GEOGRAPHY | 11/12 |

FIG. 13

EMBEDDED LEARNING TOOL

CROSS-REFERENCES TO RELATED APPLICATIONS

This application is a provisional application filed pursuant to 37 C.F.R. 1.53.

STATEMENT REGARDING FEDERALLY SPONSORED RESEARCH OR DEVELOPMENT

Not Applicable.

MICROFICHE APPENDIX

Not Applicable

BACKGROUND

1. Field of the Invention

This invention relates to the field of education. More specifically, the invention comprises a method for embedding educational material in everyday tasks carried out on modern computing devices.

2. Background of the Invention

Modern computing devices provide an opportunity to embed a variety of educational materials. The term "modern computing devices" is broadly intended to encompass anything capable of providing questions and scoring the answers given in response to the questions. Examples of such devices include cellular phones desktop computers, and laptop computers. Of course, many other devices now incorporate text displays and keypads or other useful input devices. As an additional example, many programmable microwave ovens are capable of being modified to provide questions and score answers.

FIG. 1 shows a prior art cell phone 10. The phone includes function keys 14, keypad 12, and display 16. FIG. 2 provides a more detailed view of the keypad and display. The reader will note that the keypad includes an array of number/letter buttons 20 which can be used to input text and numbers. Menu buttons 22 can be used to scroll through various user options. Phone keys 24 are typically provided to control the conventional phone functions.

Most displays can now display text, graphics, and even photorealistic images. The depiction in FIG. 2 is a basic display function informing the user that he or she has an incoming call. Those skilled in the art will readily appreciate that the input and display features thus described are capable of providing complex educational materials and monitoring a user's responses to those materials. These features are exploited by the present invention to provide a flexible and useful educational tool.

BRIEF SUMMARY OF THE INVENTION

The present invention is an educational tool which is embedded within the functions of common computing devices. In the preferred embodiment, the educational tool is used as a "gateway" to selected cellular phone functions. A parent may elect to install the tool on a child's cellular phone. When the child selects the text message function, the educational tool blocks access until the child successfully answers an educational question or questions. As an example, the parent may choose a set of questions testing vocabulary words commonly found on the Scholastic Aptitude Test. The child must correctly answer a question before being allowed to send a text message.

The same gateway function can be implemented on other computing devices. As a second example, the educational tool can block access to selected functions of a desktop or laptop computer until the user responds to the educational questions. Question selection and customization features are preferably provided over the Internet. Tabulated results data is preferably also presented over the Internet. In the case of a parent/child scenario, the questions and results would be only available on a separate password-protected device. However, another user might wish to administer the questions to himself or herself. In that case, the question selections, presentations, and results could be presented on the same device. In the preferred embodiment, an emergency override feature is included so that a user facing an urgent situation could bypass the gateway function.

REFERENCE NUMERALS USED

| | | | |
|---|---|---|---|
| 10 | cell phone | 12 | keypad |
| 14 | function keys | 16 | display |
| 18 | alphanumeric text | 20 | number/letter button |
| 22 | menu button | 24 | phone keys |
| 26 | question | 28 | response options |
| 30 | answer indicator | 32 | scoring indicator |
| 34 | result indicator | 36 | cell service provider |
| 38 | server | 40 | R/F connection |
| 42 | Internet connection | 44 | control computer |
| 46 | provided answer | 48 | storage notice |
| 50 | additional option | 52 | bypass message |
| 54 | control computer display | 56 | topic selection |
| 58 | difficulty selection | 60 | control phone |
| 62 | response options | 64 | windows display |

DRAWING FIGURES

FIG. 5 is a schematic depiction of a cell phone display presenting the result of a user's answer.

FIG. 7 is a schematic depiction of a cell phone display presenting the result of a user's answer.

FIG. 8 is a schematic depiction of a cell phone display presenting additional user options.

Figure 9:
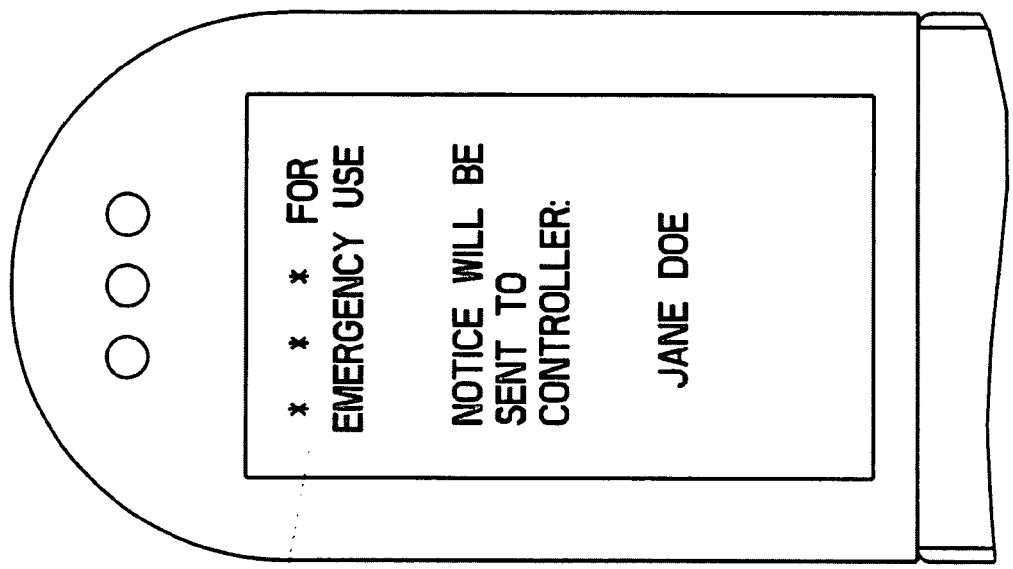

FIG. 9 a schematic depiction of a cell phone display presenting an emergency override option.

Figure 10:
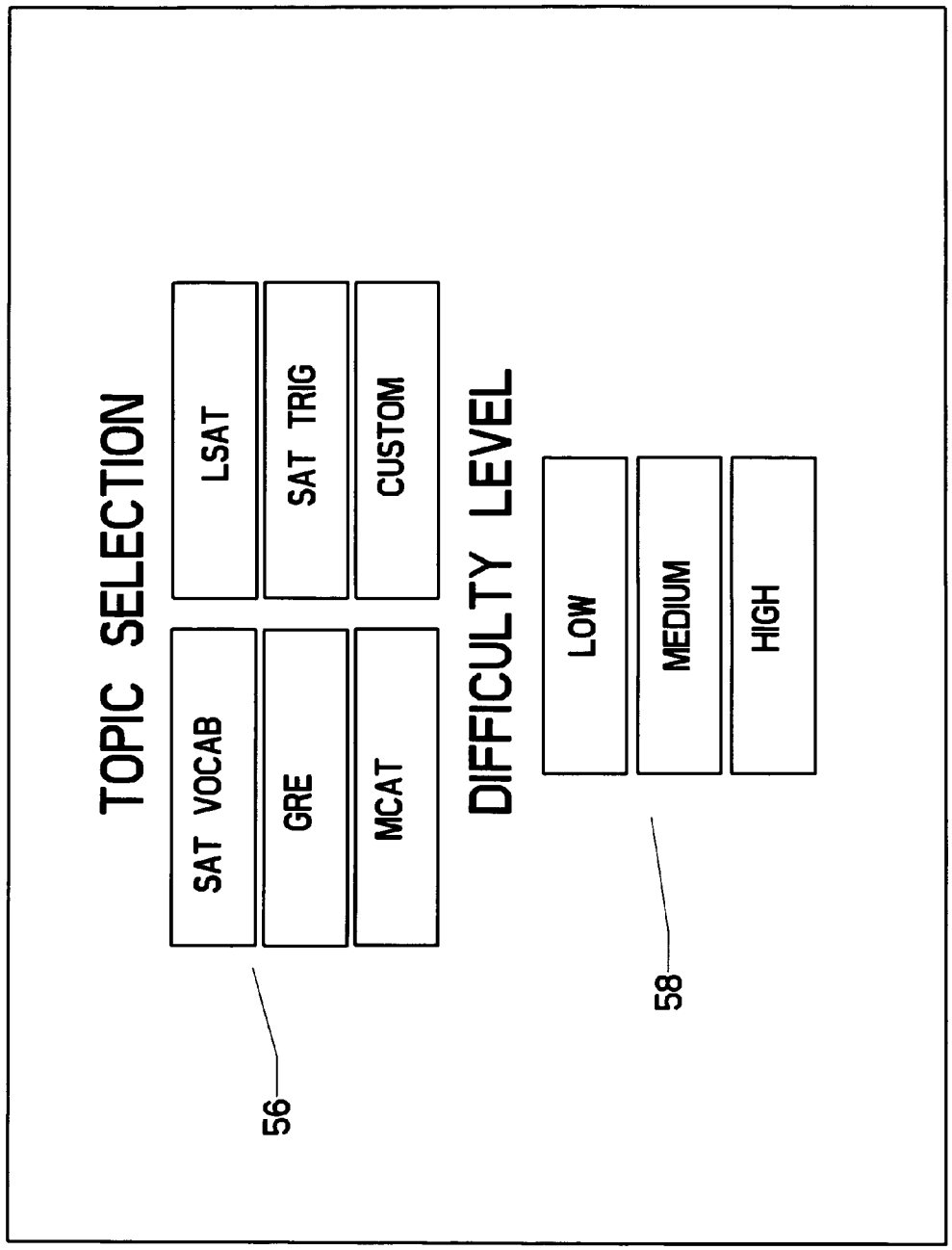

FIG. 10 is a schematic depiction of a control computer display, showing configuration options for a cell phone-based embodiment.

Figure 11:
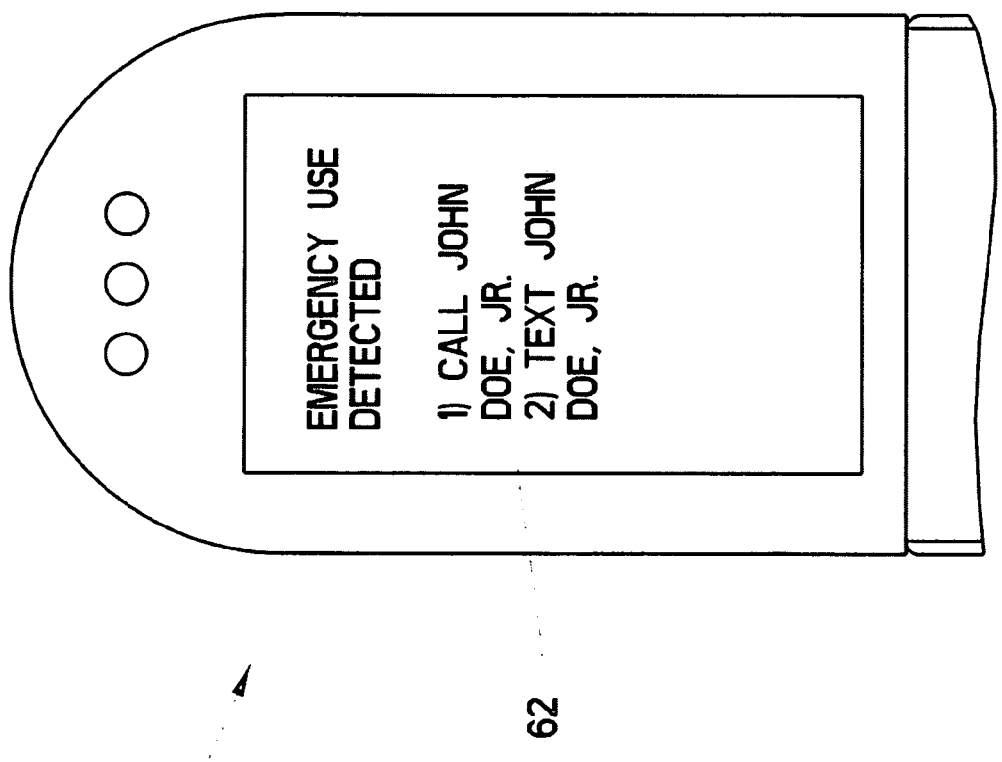

FIG. 11 is a schematic depiction of a cell phone display presenting options for the controller.

FIG. 12 is a schematic depiction of a control computer display, showing results of a series of questions and answers.

FIG. 13 is a schematic depiction of a control computer display, showing results grouped by subject.

Figure 14:
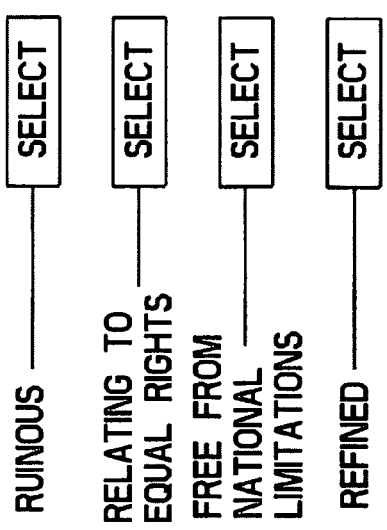

FIG. 14 is a schematic depiction of a windows display, showing an alternate embodiment.

DETAILED DESCRIPTION OF THE INVENTION

Figure 1:
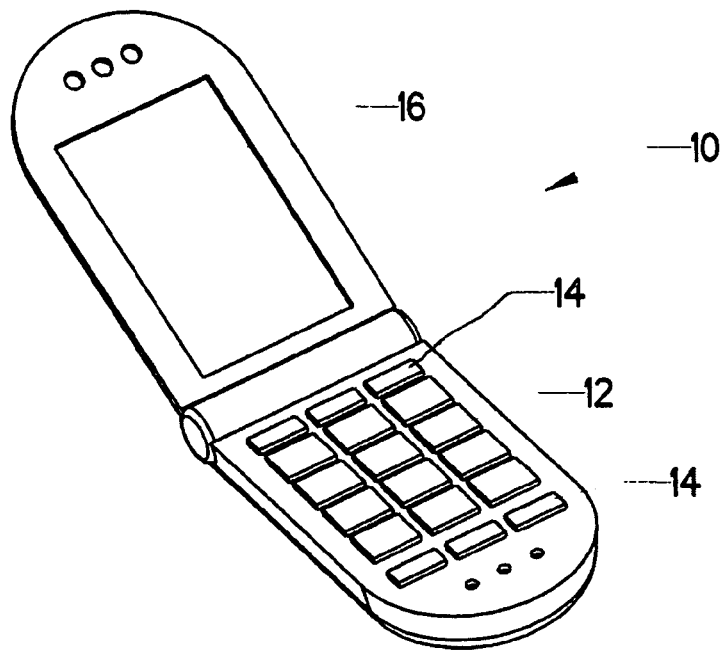
FIG. 1 is a perspective view, showing a prior art cell phone.
Figure 2:
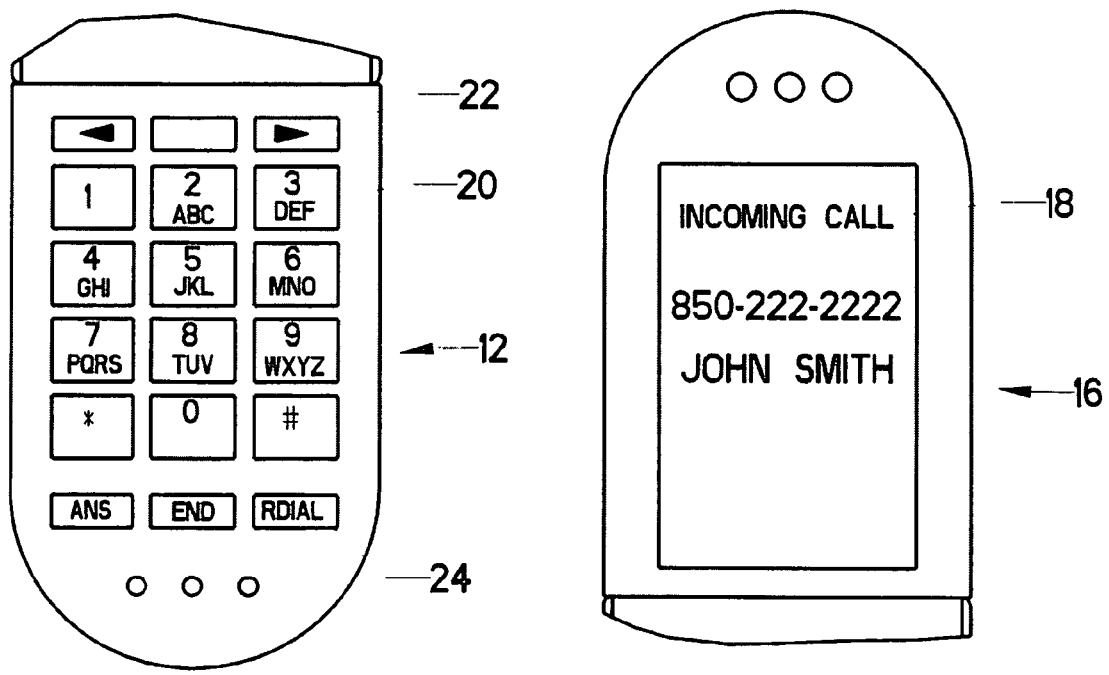
FIG. 2 is a detail view, showing the keypad and display of a prior art cell phone.
Figure 4:
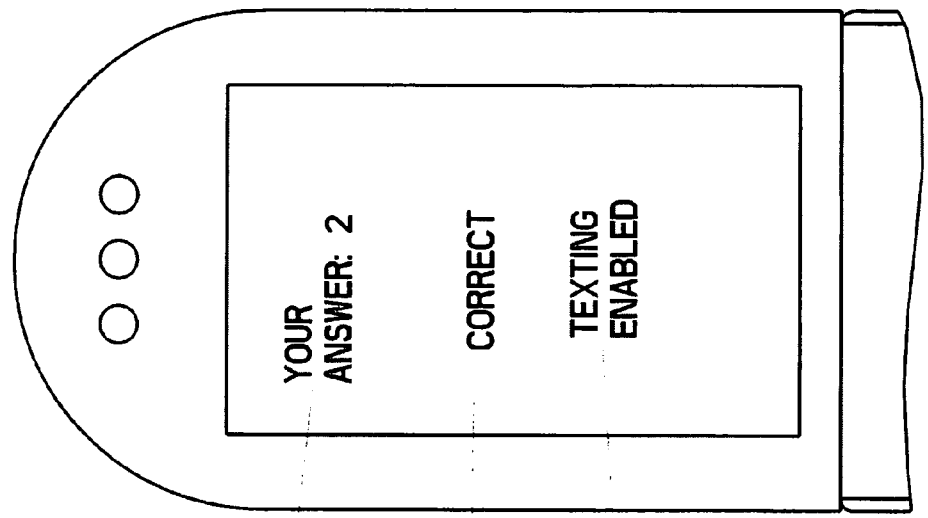
FIG. 4 is a schematic depiction of a cell phone display presenting the result of a user's answer.
Figure 3:
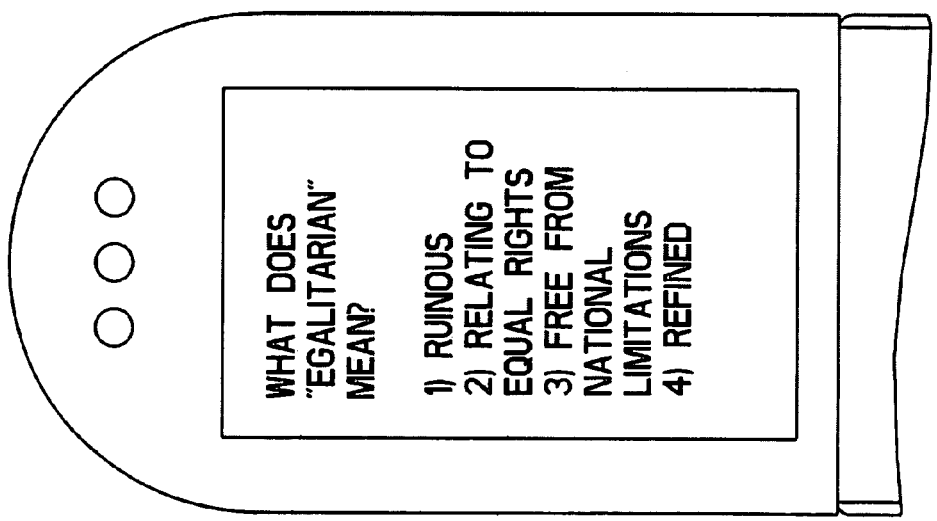
FIG. 3 is a schematic depiction of a cell phone display presenting a question with possible responses.

The operation of the invention will now be described in detail. The input and display functions of a prior art cell phone were shown in FIG. 2. FIGS. 3-5 show only the display functions. The reader should bear in mind throughout this description that the use of a cell phone is only one example among many possibilities.

In the illustrated scenario, a parent has chosen to install the educational tool on a cell phone belonging to her teenage son. The cell phone thereby becomes the "primary computing device." When the son selects text messaging, a display such as shown in FIG. 3 appears. Question 26 is presented (a vocabulary question) along with four response options 28. The user interface can assume many forms. In this example, the user selects an answer by pressing a number key corresponding to that answer (1 through 4). The invention thereby applies a "gateway function." The term "gateway function" means that the software makes the use of a selected feature on the primary computing device contingent on correctly responding to one or more educational queries.

If the user selects "2," then a display such as shown in FIG. 4 appears. Answer indicator 30 displays the user's selection. Scoring indicator 32 indicates whether the answer is correct or incorrect. Result indicator 34 shows the result which follows from the user's selection of a correct answer (in this case the result which flows from a correct answer has been selected to be the enabling of the text messaging feature) which follows the answer. The phone's text messaging feature is then enabled and the son can proceed to send a text message or messages (with the number allowed being selected by the parent).

If the user had chosen incorrectly, he would have seen a display such as shown in FIG. 5. In this case scoring indicator 32 shows "incorrect" and result indicator 34 says "access denied." The phone's text messaging function is then disabled. Thus, the reader will perceive the "gateway" function of the invention. The invention uses educational questions as a test to grant or deny access to a selected function.

Figure 6:
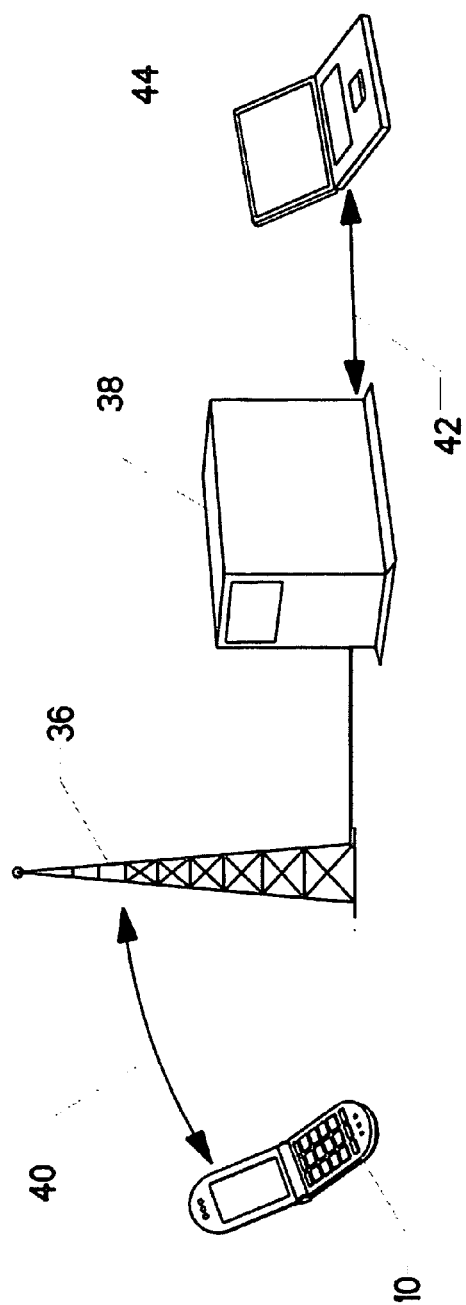
FIG. 6 is a schematic depiction of communication between a cell phone, a cell service provider, and another remote device.

FIG. 6 shows the preferred connectivity between the various components. The gateway function is implemented on the primary computing device (in this case cell phone 10). The control of the questions and the monitoring of the answers and other functions are preferably carried out by a control computing device (in this case control computer 44). Of course, in some instances the primary computing device and the control computing device may be one and the same. However, FIG. 6 represents a more common scenario in which they are separate.

It is preferable to have communication between the primary computing device and the control computing device. FIG. 6 shows one way in which this can be carried out. Cell phone 10 carries out two way radio communications (labeled as R/F connection 40) with cell service provider 36. Cell service provider 36 has computer equipment running software which controls these communications. The software runs on any number of suitable devices, which are designated in FIG. 6 as server 38.

Control computer 44 is preferably able to communicate with the cell service provider. Internet connection 42 can be used for this purpose. The arrangement shown in FIG. 6 will suggest many possibilities to those familiar with the art. As an example, it is possible to have the gateway software running on server 38 rather than cell phone 10. On the other hand, the code needed to perform the gateway function can be easily transmitted to cell phone 10 and stored there. This flexibility allows the questions to be easily updated without requiring too much memory usage on a small device such as a cell phone.

It is also possible to make the cell service provider's computer the "control computing device." The person ordering the service could request the implementation of the present invention from the cell service provider directly. The service provider would then perform the control functions.

The use of control computer 44 allows the person supervising the gateway function to update the test selections and monitor the progress of the cell phone user. Numerous options are preferably provided. An objective of the invention is to actually teach the user. As individuals learn in different ways, it is important to be able to customize the invention to suit each user's needs. As one example, it may not be desirable to simply deny access to a function when the cell phone user answers incorrectly.

FIGS. 7 and 8 show an alternative. In this embodiment, the software stores a series of questions and answers. If the user responds incorrectly, he or she sees a display such as shown in FIG. 7. Scoring indicator 32 states that the answer provided was incorrect. Instead of simply denying access, however, the software displays provided answer 46 and then displays storage notice 48. The storage notice indicates that the question and answer will be stored on the cell phone for a period selected by the control computer (in this case 8 hours). This user can retrieve the question and answer at any time to study and memorize it.

A display such as shown in FIG. 8 will then be presented. Additional option 50 allows the user to attempt the last two questions (before the one just missed). If the user elects to attempt to answer the past two questions, these will be presented and answers will be accepted. If the user successfully answers both of these, then the selected feature on the cell phone will be enabled. Those skilled in the art will thereby realize that an effective teaching pattern can be created. When the user misses a question he is given time to study the correct answer and memorize it. Of course, the software should not use a question as a gateway function during the time period in which the question and its corresponding answer is in storage on the device.

One potential disadvantage of the proposed gateway function is the unintended blocking of a device when an urgent need for communication arises. As one example, a user might need to use his cell phone in order to report an automobile accident. In such a situation, the user would not want to lose time answering questions. Thus, an emergency bypass feature is preferably provided. FIG. 9 illustrates a representative display reminding the user of the function. Bypass message 52 informs the user that entering three asterisks (* * *) at any time will bypass the gateway function.

Of course, the system may need to be configured to alert the control computing device or some other selected device that the bypass function has been used. The message reminds the cell phone user that employing the bypass feature will cause notice to be sent to the control computer. The notice could be sent by a variety of means, including an email, a text message, or a recorded voice message.

As an example, a parent may wish to configure the system to send an "emergency use detected" signal to her cell phone. Her cell phone would then display something like what is shown in FIG. 11. In this example, the parent's cell phone is actually serving as the control computing device (designated control phone 60 in the view). Response options 62 can be presented as well. These allow the parent to immediately phone the child or send a text message.

As mentioned previously, the proposed invention preferably allows the control computing device to customize the testing features and study and organize the results. These features can obviously be implemented in an infinite number of ways. FIGS. 10, 12, 13, and 14 provide samples of the possibilities.

FIG. 10 shows a display screen that could be presented to a user operating control computer 44 (of FIG. 6). The particular display screen allows a user to select topics for the questions presented. These are presented as "buttons" in a Windows-style user interface. The user employs a mouse or other pointing device to select the topic from the categories shown in topic selection 56. The user can also select a "custom" category. If the user chooses this option he or she is given a menu structure that allows the submission of questions and answers selected by the user. As an example, a user might choose to create a set of questions testing family history. The user is also given a difficulty selection 58. The user can select the difficulty of the questions by pressing one of these buttons.

Returning now to FIG. 6, the interaction of the control computing device with the primary computing device (in this case a cell phone) will be explored further. Assume that the user of the control computing device (in this case control computer 44) selected "SAT VOCABULARY" and "MEDIUM" difficulty. This information is transmitted over Internet connection 42 to server 38. Server 38 then loads a sequence of appropriate questions and answer possibilities and transmits them to cell phone 10.

The user's responses are noted on the cell phone but also transmitted back to cell service provider 36 and stored on server 38. The operator of the control computer can periodically review the answers and the performance of the cell phone user. FIG. 12 shows a display allowing the operator of the control computer to review the results by date. The score reflects the ratio of correct answers to total answers given. The query buttons allow the user to select a particular date and then view the actual questions provided on that date and the answers given.

Numerous other displays depicting the results are preferably provided. Some users will want to test the primary computing device operator on a variety of subjects. This is particularly useful when studying for standardized tests such as the SAT. FIG. 13 depicts a control computer display 54 showing results by subject area. The user is thereby able to identify strengths and weaknesses. In this example, the user would quickly note that geometry is a weak area. The questions could then be reconfigured to focus on that area. The difficulty level might also be adjusted so that geometry includes easier questions while geography includes harder questions.

While a cell phone has been discussed as the primary computing device in most of the examples, those skilled in the art will realize that the invention can be applied to many other types of computing devices. FIG. 14 shows one such example. The gateway function is implemented on a computer presenting windows display 64. After the windows log-in is complete, the user is required to answer a question or questions before proceeding. As for the cell phone example, the questions and results can be monitored from a separate control computer. Thus, a parent can configure a teenager's computer to provide the educational questions.

Unlike the example of FIG. 6, the communications in this example would likely be carried out entirely over the Internet. The questions, answers, and data management tools could still be provided on a separate server, or they might be loaded directly onto the control computer. Of course, in the case of a user wanting to administer the questions to himself or herself, all the operations could be carried out on a single computer.

A single computer could also be used to implement the process for the prior examples of a parent wanting to use the gateway function to educate a child. The control functions (selecting questions, reviewing answers, etc.) would be carried out on the same computer as the gateway functions (the primary computing device and the control computing device would be the same computer). However, the control functions would be separated into a password-protected menu structure that only the parent could access. There would still be two-way communications between the gateway functions and the control functions, but these communications would be internal to the single computer.

The inventive process is potentially useful for any type of computing device providing a display and input functions. Since most educational products are directed toward young people, it would be natural to apply the inventive process to products used by such persons. Further examples would therefore include loading the product on a device such as an MP3 or other music player (the "iPOD" being one good example). The gateway function could require the user to answer educational questions prior to being able to play songs. Of course, many such devices do not have radio communications like a cellular phone. However, they are generally configured to communicate via a hard-link to a separate computer. In this scenario the "primary computing device" would be the iPOD and the "control computing device" would be the computer that is synced with the iPOD.

It might be desirable to extend the chain of communication a bit further. For instance, a high school student may have an iPOD that is synced to her own laptop computer. A parent may wish to use a separate control computer that communicates with the student's laptop over an Internet connection. The control computer downloads the questions to the student's laptop, which then downloads the questions to the music player. The student's performance in answering the questions is transmitted in the opposite direction. Those skilled in the art will know that these communications are not continuous. They would only occur when the student "syncs" the iPOD. However, the invention can function quite well in this environment.

The aforementioned customization features preferably allow the parent even more flexibility. The parent might configure the system to apply a "mini test" before allowing the student to purchase new music for the MP3 player. When the student attempts to log into the music downloading site, the system would require the student to answer a collected series of questions. Many more permutations are apparent.

Another parent might configure the system to control access to certain websites. The student could be given unlimited access to educational websites, yet the access to entertainment websites could be controlled by the invention's gateway function.

The preceding description contains significant detail regarding the novel aspects of the present invention. It should not be construed, however, as limiting the scope of the invention but rather as providing illustrations of the preferred embodiments of the invention. As an example, many different types of questions could be substituted for the examples actually illustrated. Some embodiments could even present images or short videos as part of the gateway function. Accordingly, the scope of the invention should be fixed by the following claims, rather than by the examples given.

The invention claimed is:

1. A method for educating a user, comprising:
   a. providing a primary computing device, having a display and an input function for receiving input from said user;
   b. providing a control computing device;
   c. providing a two-way communications link between said primary computing device and said control computing device;
   d. selecting a function to be controlled on said primary computing device, with said function on said primary computing device being a communication function between said primary computing device and a third computing device which is separate from said primary computing device and said control computing device;
   e. transmitting a question and a plurality of response options associated with said question from said control computing device to said primary computing device over said two-way communications link;
   f. when said user attempts to access said selected function on said primary computing device, denying said access and displaying said question and said plurality of response options on said display of said primary computing device;
   g. accepting said user's selection of one of said plurality of response options as an answer;
   h. determining whether said answer is correct; and
   i. controlling said user's access to said selected function on said primary computing device on the basis of whether said answer is correct.

2. A method for educating a user as recited in claim 1, further comprising transmitting said determination of whether said answer is correct from said primary computing device to said control computing device over said two-way communications link.

3. A method for educating a user as recited in claim 2, further comprising:
   a. providing a memory storage in communication with said control computing device; and
   b. storing each of said determinations of whether said answer is correct transmitted from said primary computing device in said memory storage.

4. A method for educating a user as recited in claim 3, further comprising:
   a. providing a user interface associated with said control computing device; and
   b. retrieving said determinations of whether said answer is correct transmitted from said primary computing device stored in said memory storage and displaying them on said user interface.

5. A method for educating a user as recited in claim 1, further comprising:
   a. providing a user interface associated with said control computing device; and
   b. wherein said user interface allows a person using said control computing device to select the questions.

6. A method for educating a user as recited in claim 1, wherein:
   a. said primary computing device and said control computing device are implemented on the same computer; and
   b. access control is provided for said control computing device functions on said control computing device.

7. A method as recited in claim 1, wherein said primary computing device is selected from the group consisting of a cell phone, a portable music player, and a personal computer.

8. A method for educating a user as recited in claim 1, further comprising:
   a. providing a user interface associated with said control computing device; and
   b. wherein said user interface allows a person using said control computing device to select the difficulty of the questions.

9. A method for educating a user as recited in claim 2, further comprising:
   a. providing a user interface associated with said control computing device; and
   b. wherein said user interface allows a person using said control computing device to select the difficulty of the questions.

10. A method for educating a user, comprising:
    a. providing a first cell phone having a display, a keypad for receiving input from said user, and a text messaging function for allowing said first cell phone to communicate with a second cell phone;
    b. providing a control computing device with an associated memory storage;
    c. providing a two-way communications link between said first cell phone and said control computing device;
    d. storing a plurality of questions in said memory storage associated with said control computing device, wherein each of said plurality of questions has associated therewith a plurality of response options;
    e. transmitting one of said plurality of questions and said plurality of response options associated therewith from said control computing device to said first cell phone over said two-way communications link;
    f. when said user attempts to access said text messaging function, denying said access and displaying one said transmitted question and said associated plurality of response options on said display;
    g. accepting said user's selection of one of said plurality of response options as an answer;
    h. determining whether said answer is correct; and
    i. controlling said user's access to said text messaging function between said first cell phone and said second cell phone on the basis of whether said answer is correct.

11. A method for educating a user as recited in claim 10, further comprising transmitting said determination of whether said answer is correct from said first cell phone to said control computing device over said two-way communications link.

12. A method for educating a user as recited in claim 11, further comprising storing each of said determinations of whether said answer is correct transmitted from said first cell phone in said memory storage associated with said control computing device.

13. A method for educating a user as recited in claim 10, further comprising:
    a. providing a user interface associated with said control computing device; and
    b. retrieving said determinations of whether said answer is correct transmitted from said associated memory storage and displaying them on said user interface.

14. A method for educating a user as recited in claim 10, further comprising:
    a. providing a user interface associated with said control computing device; and
    b. wherein said user interface allows a person using said control computing device to select the questions.

15. A method for educating a user as recited in claim 10, further comprising: a. providing a user interface associated with said control computing device; and b. wherein said user interface allows a person using said control computing device to select the difficulty of the questions.

* * * * *